(12) United States Patent
Oesterling et al.

(10) Patent No.: US 7,245,951 B2
(45) Date of Patent: Jul. 17, 2007

(54) METHOD AND SYSTEM FOR TELEMATIC DATA TRANSFER

(75) Inventors: Christopher L. Oesterling, Troy, MI (US); Gary A. Watkins, Royal Oak, MI (US); Jeffrey M. Stefan, Clawson, MI (US)

(73) Assignee: General Motors Corporation, Detroit, MI (US)

( * ) Notice: Subject to any disclaimer, the term of this patent is extended or adjusted under 35 U.S.C. 154(b) by 300 days.

(21) Appl. No.: 10/806,497

(22) Filed: Mar. 23, 2004

(65) Prior Publication Data

US 2005/0215282 A1    Sep. 29, 2005

(51) Int. Cl.
H04M 1/00        (2006.01)
(52) U.S. Cl. ............................... 455/575.9; 455/569.1; 455/550.1; 455/569.2; 455/557; 455/556.1
(58) Field of Classification Search ........ 455/418–420, 455/423–425, 507–512, 78, 88, 550.1, 552.1, 455/553.1, 556.1–556.2, 569.2, 575.2, 575.9, 455/61.1, 450–451, 452.1, 452.2, 517; 340/445–447, 340/539.1, 539.11, 539.19–539.18, 539.24, 340/3.1–3.2, 3.21, 316, 3.5, 3.51, 825.2, 340/825.21, 825.22, 7.41–7.43, 7.51–7.57, 340/10.1–10.3, 10.31, 286.01, 286.02, 309.16, 340/309.2, 309.3, 286.06; 709/203, 227–229
See application file for complete search history.

(56) References Cited

U.S. PATENT DOCUMENTS

| 6,044,265 | A | * | 3/2000 | Roach, Jr. .................... 455/419 |
|---|---|---|---|---|
| 6,064,970 | A | | 5/2000 | McMillan et al. ............. 705/4 |
| 6,161,071 | A | * | 12/2000 | Shuman et al. ............... 701/48 |
| 6,480,476 | B1 | | 11/2002 | Willars |
| 6,847,825 | B1 | * | 1/2005 | Duvall et al. ............ 455/456.3 |
| 6,963,759 | B1 | * | 11/2005 | Gerson ........................ 455/563 |
| 6,970,703 | B2 | * | 11/2005 | Fuchs et al. ............. 455/426.1 |
| 6,993,316 | B2 | * | 1/2006 | Marko et al. ............ 455/343.1 |
| 7,012,993 | B2 | * | 3/2006 | Alton ...................... 379/26.01 |
| 2002/0197988 | A1 | * | 12/2002 | Hellaker ..................... 455/423 |
| 2003/0109268 | A1 | | 6/2003 | Fraser et al. |
| 2003/0185162 | A1 | | 10/2003 | Fraser et al. |
| 2003/0232619 | A1 | | 12/2003 | Fraser |
| 2004/0049336 | A1 | * | 3/2004 | Knockheart et al. ........ 701/201 |
| 2004/0054444 | A1 | | 3/2004 | Abeska et al. |
| 2004/0104842 | A1 | * | 6/2004 | Drury et al. ........... 342/357.13 |
| 2004/0142659 | A1 | * | 7/2004 | Oesterling ................ 455/11.1 |
| 2004/0233045 | A1 | * | 11/2004 | Mays ...................... 340/425.5 |
| 2005/0014487 | A1 | * | 1/2005 | Kobayashi et al. ...... 455/456.1 |
| 2005/0130723 | A1 | * | 6/2005 | Grivas et al. ............ 455/575.9 |

* cited by examiner

Primary Examiner—Meless Zewdu
(74) Attorney, Agent, or Firm—Anthony Luke Simon

(57) ABSTRACT

A method for telematic data transfer comprising the steps of: monitoring parameters for personal communications made through a telematics unit in a vehicle between the telematics unit and at least one remote location; determining a communication requirement for communicating between the telematics unit and the remote location; and scheduling and executing the determined communication responsive to the monitored parameters to increase likelihood of success of the determined communication.

19 Claims, 6 Drawing Sheets ically, this example is set forth with respect to personal calling.

METHOD AND SYSTEM FOR TELEMATIC DATA TRANSFER

TECHNICAL FIELD

This invention relates to a method and system for telematic data transfer.

BACKGROUND OF THE INVENTION

The opportunity to utilize wireless features in a mobile vehicle is ever increasing as the automobile is being employed as a communications and entertainment platform as well as a transportation platform. Conventional wireless systems within mobile vehicles, embodied within telematics units, provide voice and minimal data communications.

Telematics units are also utilized as personal calling devices, taking advantage of a telephony device embedded within the telematics unit. In addition to the increased personal calling usage, data transfers to and from vehicles are increasing in frequency and duration. Examples of data transfers are requests for personal calling replenishment units, diagnostic queries, diagnostic reports, and music file downloads.

The increase in personal calling increases risk that a data transfer to or from the vehicle could be interrupted by personal calling. In a known example, a data call is interrupted and terminated when a telematics subscriber initiates a personal call. This condition delays data transfer to and from the telematics unit.

SUMMARY OF THE INVENTION

Advantageously, according to one example, this invention provides a method and system for telematic data transfer that monitors personal communication parameters for personal communications made through a telematics unit in a vehicle, determines a communication requirement for communicating between the telematics unit and a call center or other remote location, and schedules and executes the determined communication responsive to the parameters to increase the chance of success of the determined communication.

Advantageously, according to a preferred example, this invention provides a method for telematic data transfer that monitors personal calling parameters for calls made through a telematics unit in a vehicle, determines an outbound call requirement for placing a call from the telematics unit to a call center or other remote location, and schedules and executes the outbound call responsive to the profile to increase the chance of success of the outbound call.

Advantageously, according to another preferred example, this invention provides a system for telematic data transfer including a telematics unit in a vehicle including a mobile communication device that has a data transfer mode and a personal communication mode, wherein activation of the personal communication mode interrupts the data transfer mode, comprising: a monitor for monitoring parameters for personal communications made through the telematics unit between the telematics unit and at least one remote location; and a communication scheduler for scheduling and executing a data transfer communication in the data transfer mode responsive to the monitored parameters to increase likelihood of success of the data transfer communication and minimize interruption by a personal communication mode.

DESCRIPTION OF AN EXEMPLARY EMBODIMENT

Figure 1:
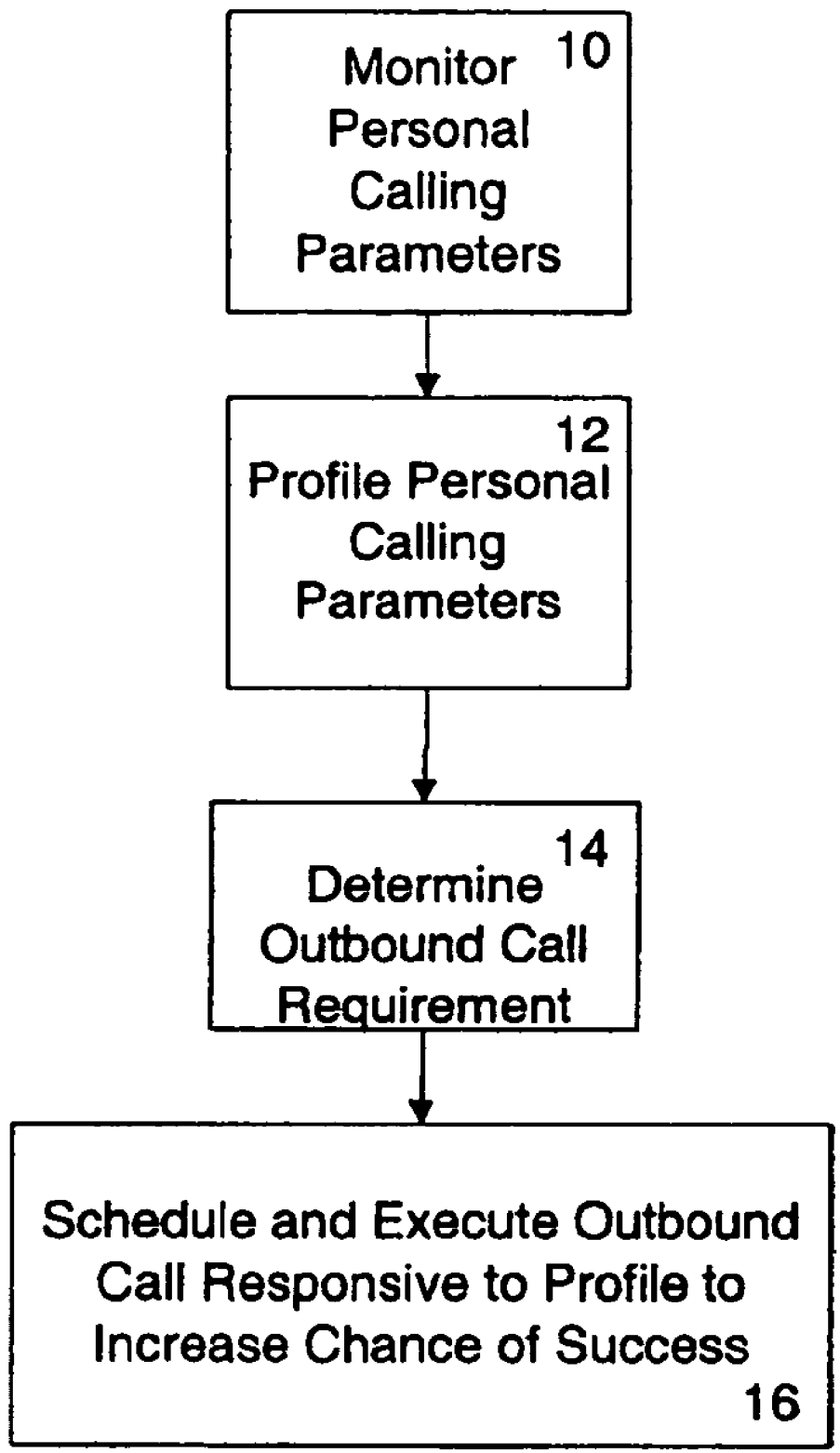
FIG. 1 illustrates an example method according to this invention.
Figure 2:
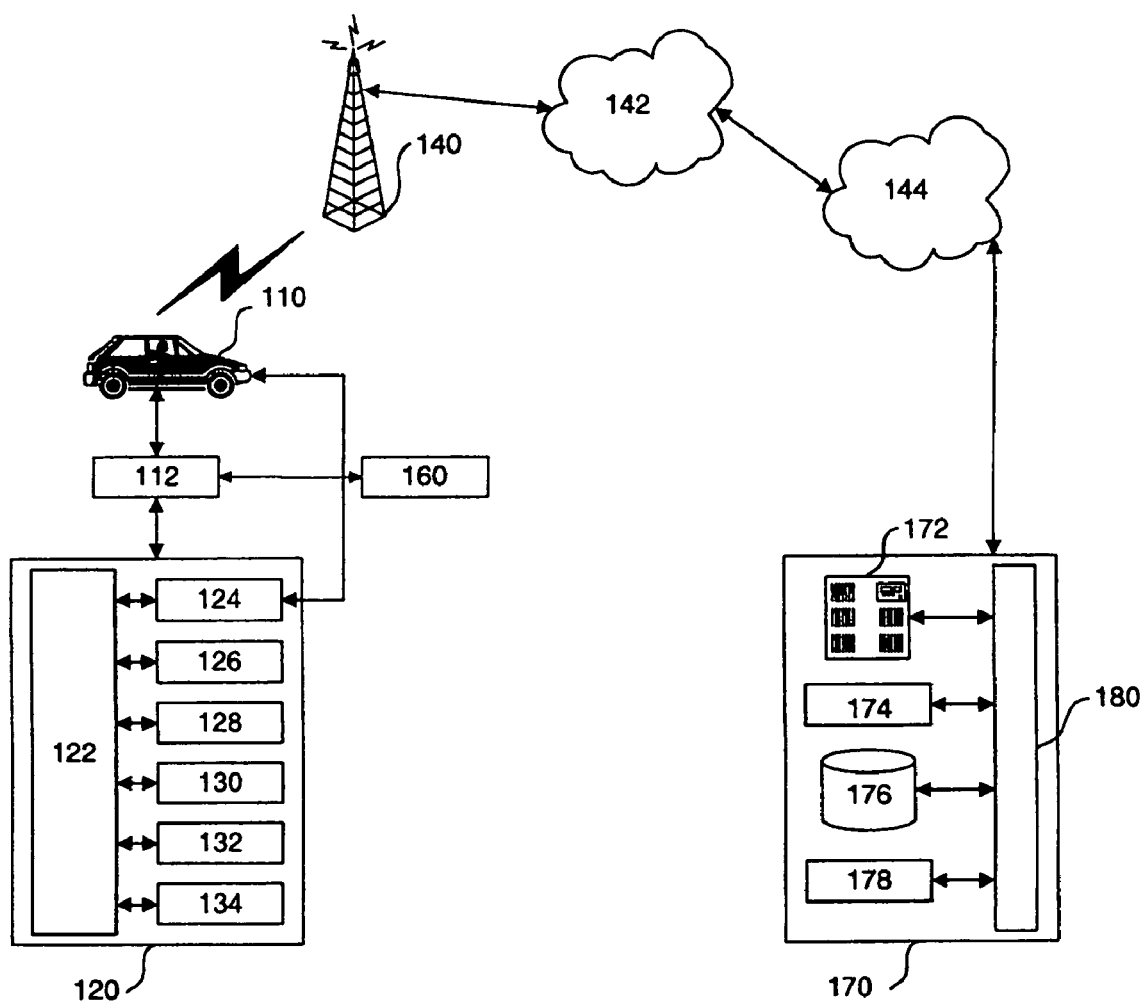
FIG. 2 illustrates an example system for implementing this invention.

Referring to FIGS. 1 and 2, within a vehicle 110, a telematics unit 120 is used as a personal communication device allowing a vehicle driver or occupant to make and receive mobile voice calls or other mobile communications and is also used as a data transfer device allowing for transferring data to and from the telematics unit for use in managing the telematics unit 120 or other vehicle systems 160 (well known in the art) connected to the vehicle bus 112. Data transfer may be accomplished by any known or suitable form of mobile communication connection to the telematics unit 120.

The method monitors personal communication parameters 10, which communication may be personal voice calling or other form of personal communication with a remote location. For purposes of illustration, this example is set forth with respect to personal calling.

Personal calling parameters include, for example, call duration, time between calls and the time of day that calls are received and placed. This monitoring function 10 may be implemented as part of the software within the telematics unit 120, and the monitored parameters are used at step 12 to form a profile. The level of complexity of the profile is a choice of the system designer, but elements may include the typical time from vehicle start-up until the placing or receiving of the first personal calling call, the typical duration of a personal calling call, and the typical time interval between personal calling calls, the typical times of day that the vehicle is running and that personal calling calls are more frequent and also the typical times of day that the vehicle is running and that personal calling calls are less frequent.

Step 14 represents the determination that the telematics unit 120 is to place an outbound call. This determination may be for an automatic update of the telematics unit 120 (for example, to automatically purchase additional pre-paid personal calling minutes if the system is low), or for an automatic reporting of system messages (for example, to report service alerts, etc.). Additionally, the determination at step 14 may be in response to a call received from a call center 170 (or another facility) for communicating with vehicle systems. For example, if an inbound call from the call center 170 failed to complete its task, then a trigger is automatically set for the vehicle to call back to the call center or facility 170. This callback is then scheduled during step 16.

Step 16 represents the scheduling and execution of the outbound call determined at step 14. The scheduling and execution is responsive to the profile determined at step 12 and is done because the telematics unit 120 gives priority to personal calling. For example, if the vehicle operator initiates personal calling while a data transfer call determined from step 14 is already taking place, then the data transfer call is interrupted to allow the operator to execute the personal calling call. By scheduling the data transfer call responsive to the parameters, for example, as indicated by the profile, the chance is minimized that a call determined at step 14 is interrupted by personal calling. This in turn improves the chance of success of the required data transfers to and from the vehicle.

For example, if a call is required to execute while the vehicle is running, and the next time the vehicle starts is during the morning, then upon vehicle start-up, the profile is checked to determine relevant typical parameters of morning personal calling. If the profile indicates that there is typically a morning call immediately after the vehicle is started, then the outbound required call from step 14 will not occur until after the typical period of the first morning call. If there is no typical morning call, or no typical morning call immediately after the vehicle is started, then the outbound required call from step 14 will occur after vehicle start-up if its predicted duration is less than the time until the first typical call. So if the required call is a data call with a typical duration of two minutes, the required call is scheduled and executed immediately after vehicle start-up if there is no typical call occurring within two minutes of vehicle start-up.

In another example, if the outbound call does not require the vehicle to be running, then the profile is checked to determine whether the vehicle is typically running at the desired call time, and if not, then the call is placed.

In yet another example, the required outbound call from step 14 is predicted to last three minutes, and the vehicle driver typically makes several calls during the first ten minutes of vehicle operation, with the typical interval between calls of less than three minutes. In this case, the outbound call is not placed until after there is typically a three-minute period of no personal calling activity. This approach minimizes the chance that personal calling will interfere with a data transfer call determined at step 14 and maximizes the chance of success of the data transfer call.

In another example, during a data transfer call, the profile determined at step 12 is transferred to the call center 170. The call center 170 utilizes the profile and then implements steps 14 and 16 to place calls to the vehicle. Thus in the event that the call center needs to place a call to the vehicle for purpose of transferring data (and not a voice call), the profile is utilized to schedule and place the call to minimize interference by personal calling to or from the vehicle.

FIG. 2 illustrates one embodiment of a system for predicting telematic data transfer intervals in accordance with the present invention at 100. Mobile vehicle communication system (MCVS) 100 includes a mobile vehicle communication unit (MVCU) 110 (also referred to herein as vehicle 110), a vehicle communication network 112, a telematics unit 120, one or more wireless carrier systems 140, one or more communication networks 142, one or more land networks 144, and one or more call centers 170. In one embodiment, vehicle 110 is implemented as a mobile vehicle equipped with suitable hardware and software for transmitting and receiving voice and data communications. MVCS 100 may include additional components not relevant to the present discussion. Mobile vehicle communications systems are known in the art.

Vehicle 110, via a vehicle communication network 112, sends signals to various units of equipment and systems 160 within the vehicle 110 to perform various functions such as unlocking a door, setting personal comfort settings, and calling from the telematics unit 120. In facilitating interactions among the various communication and electronic modules, vehicle communication network 112 utilizes network interfaces such as controller area network (CAN), ISO standard 11989 for high speed applications, ISO standard 11519 for lower speed applications, and Society of Automotive Engineers (SAE) Standard J1850 for high speed and lower speed applications. Vehicle communication network 112 is also referred to as a vehicle bus.

Vehicle 110, via telematics unit 120, sends and receives radio transmissions from wireless carrier system 140. Wireless carrier system 140 is implemented as a cellular telephone system, or any other suitable system for transmitting a signal from vehicle 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, such as, for example speakers 132. It is understood that the speaker 132 may be implemented as part of the vehicle audio system, which accepts audio and other signals from telematics unit 120 as is known in the art. Telematics unit 120 may include additional components and functionality as determined by the system designer and known in the art for use in telematics units.

In one embodiment, processor 122 is implemented as a microcontroller, controller, microprocessor, host processor, or vehicle communications processor. In another embodiment, processor 122 is implemented as an application specific integrated circuit (ASIC). In yet another embodiment, processor 122 is implemented as a processor working in conjunction with a central processing unit (CPU) performing the function of a general-purpose processor. GPS unit 126 provides latitude and longitude coordinates of the vehicle responsive to a GPS broadcast signal received from one or more GPS satellites (not shown). In-vehicle mobile phone 134 is a cellular type phone, such as, for example an analog, digital, dual-mode, dual-band, multimode or multi-band cellular phone.

Processor 122 executes various computer programs that interact with operational modes of electronic and mechanical systems within the vehicle 110. Processor 122 controls communications (e.g. call signals) between telematics unit 120, wireless carrier system 140, and call center 170. In one embodiment, a voice recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

Communications network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to vehicle 110 and land network 144.

Land network 144 connects communication network 142 to call center 170. In one embodiment, land network 144 is a public switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to call center 170.

Call center 170 contains one or more voice and data switches 172, one or more communication service managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in vehicle 110 through wireless carrier system 140, communication network 142, and land network 144. Switch 172 received data transmissions from or sends data transmissions to one or more communication services managers 174 via one or more network systems 180.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In addition to call center 170, a computer or network may be implemented to provide a web interface to the vehicle to allow a person to retrieve vehicle information, set vehicle parameters, or perform other interactive functions. The web interface may be implemented to access the vehicle through the call center 170, to take advantage of secure communication established by the call center with the vehicle, or the web interface may be separate, in which case, a web portal duplicates enough communication functions of the call center 172 to allow secure communication with the vehicle 110 for passing data to and from the vehicle.

Figure 3:
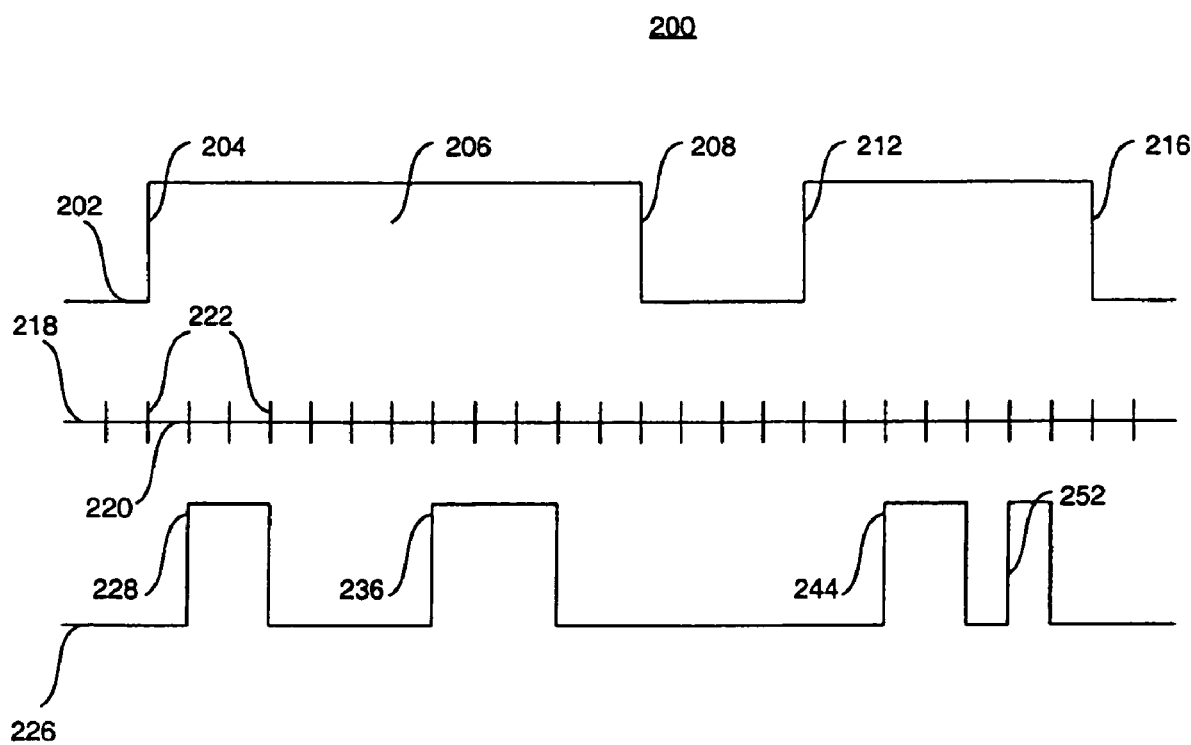
FIG. 3 is an example timing diagram in accordance with an embodiment of the present invention.
Figure 4:
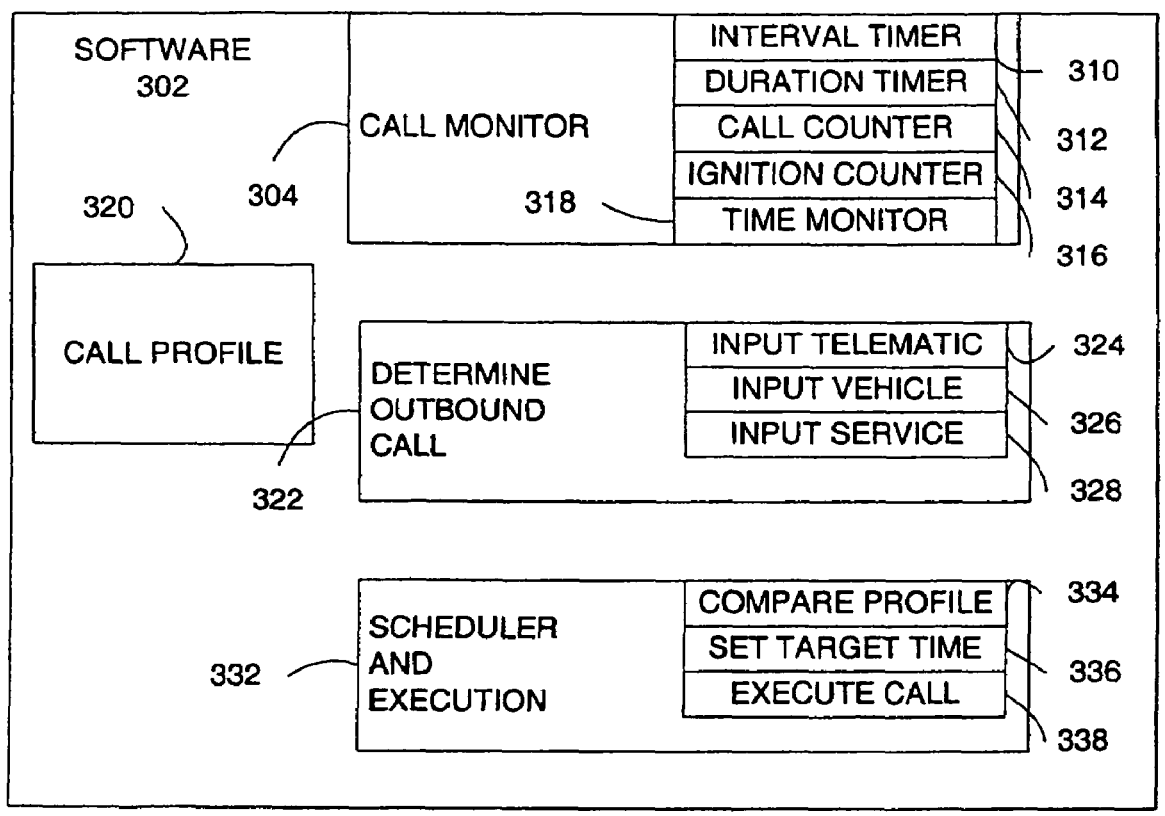
FIG. 4 is a diagram of certain example components of the present invention.

Referring now also to FIGS. 3 and 4, the diagram 200 includes graph 202, which is a linear representation of a timing graph indicating example vehicle ignition cycle state transitions. A vehicle ignition cycle is the time a vehicle is started and fully energized to the time a vehicle is turned off and fully de-energized. At the initiation of a vehicle ignition cycle 204, telematics unit 120 transitions to a fully energized state, or vehicle on state 206, with all subsystems energized.

Graph 218 is a linear representation of time intervals relative to graph 202 and graph 226. Time interval 220 indicates an elapsed time. Time tick indicators 222 represent periodic time demarcations. Time interval 220 is measured between time tick indicators 222. In one embodiment, time interval 220 represents an elapsed time of five minutes. Graph 226 is a linear representation of a timing graph indicating a subscriber initiated call.

Software 302 within the telematics unit includes a call monitor 304 that has routines to perform the functions of interval timer 310, duration timer 312, call counter 314, ignition counter 316 and time monitor 318. The interval timer 310 monitors the intervals between the first ignition 204 and the first voice call 228, and the interval between voice calls 228 and 236 and the interval between the end of voice call 236 and the end 208 of first ignition cycle 204. The interval timer 310 performs the same measurements with respect to the second ignition cycle 212 and the calls 244 and 252 occurring during the second ignition cycle. The interval timer 310 repeats this process during subsequent ignition cycles, storing the interval times in memory for profiling.

The duration timer 312 measures the duration of the voice calls 228, 236, 244 and 252. The call counter 314 accumulates the number of voice calls during the ignitions cycles, the ignition counter counts the ignition cycles and the time monitor denotes the time of ignition cycles and the voice calls to assist in profiling.

Figure 5:
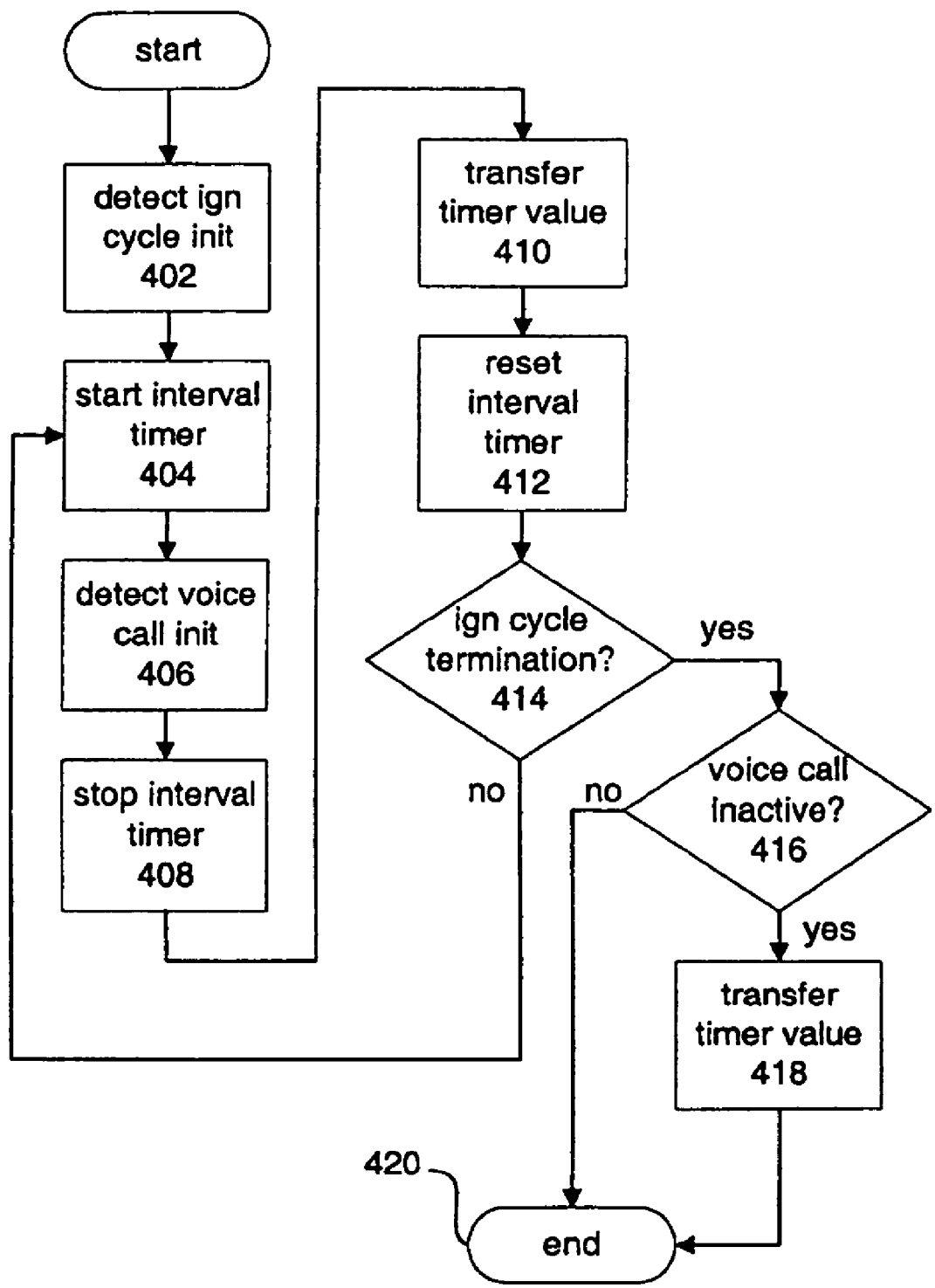
FIG. 5 is an example flow chart in accordance with an embodiment of the present invention.

Referring now also to FIG. 5, the example flow diagram 400 starts at step 402 where, upon the detection of an ignition cycle initiation 402, step 404 initializes the interval timer 310. Upon the detection of a voice call, such as 228, 236, 244 or 252, at step 406, the interval timer 310 is stopped at step 408. The time value accumulated by the interval timer is transferred 410 to memory for use by the call profile routine 320. The interval timer 310 is then reset 412, bringing the accumulated time value to zero.

If an ignition cycle termination is detected at step 414, then a test is conducted to determine whether a voice call is inactive 416. If a voice call is inactive 416, then the time value accumulated by the interval timer is transferred 418 to memory. If a voice call is active, then no interval timer value is transferred to memory. If an ignition cycle termination 414 is not detected, the interval timer 310 is restarted at block 404. The method steps end at block 420.

The duration timer, 312, call counter 314, ignition counter 316 and time monitor 318 can be readily implemented by one skilled in the art using the information herein to similarly achieve recording of the data elements describe herein for use in the system.

Figure 6:
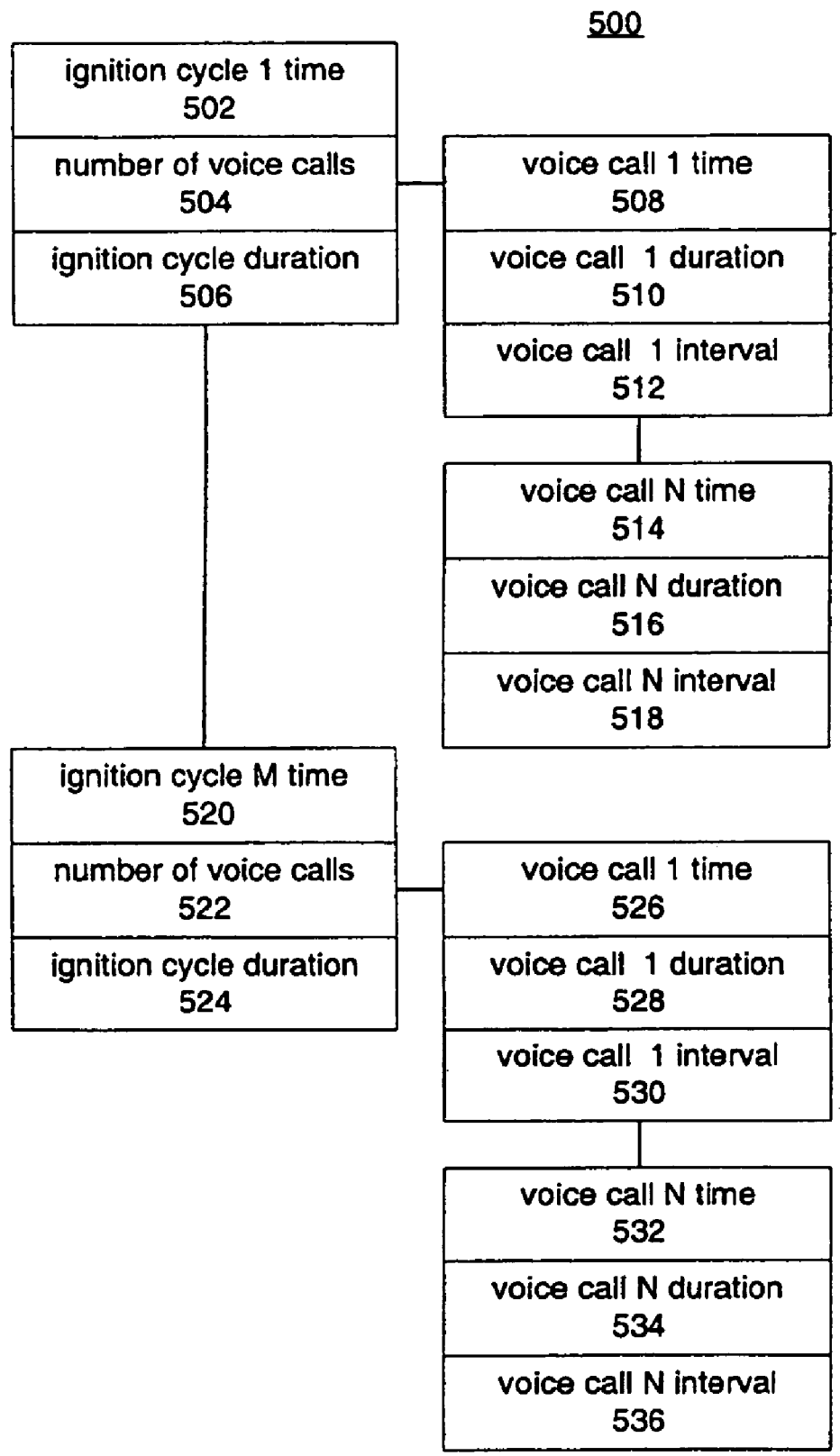
FIG. 6 is an example data structure in accordance with an embodiment of the present invention.

Referring now also to FIG. 6, the example data structure 500 shown includes summary data for ignition cycle 1-M, including the time 502, 520, number of voice calls 504, 522, and ignition cycle duration 506, 524. Each call has the associated time 508, 514, 526, 532, duration 510, 516, 528, 534, and interval 512, 518, 530, 536.

The call profile routine 320 utilizes the data structure to create a profile of the call parameters. An example profile may be (1) times during the day that the vehicle is least likely be started; (2) AM calls: average time to first voice call, average interval between voice calls, average time between end of voice calls and termination of ignition cycle; (3) PM calls: average time to first voice call, average interval between voice calls, average time between end of voice calls and termination of ignition cycle. Other specific elements of the profile may be included or substituted, if desired by the system designer, with the goal of improving likelihood that scheduled calls be made without being interfered with by voice calls.

The determine outbound call routine 322 responds to inputs to determine a desire by the system to place a call to the call center 170 (FIG. 1) or other facility or system. It is not necessary that the call is of specific nature, but examples are given for illustrative purposes. The determine outbound call routine 322, for example, implements the input telematic function 324, the input vehicle function 326 and the input service function 328. The input telematics function 324 receives requests from the telematics unit to place an outbound call. This request may be in response to a low number of prepaid personal calling minutes utilized for voice calls. The purpose of this call is to automatically execute a transaction with call center 170 to purchase and download additional prepaid calling minutes for storage in the telematics unit personal calling minute counter. Additionally, the input telematics function 324 may determine a desired call to (a) remotely access user-desired information in response to vehicle or system parameters or location, (b) perform system updates, or (c) report system messages.

The input vehicle function 326 receives requests or signals from other vehicle systems (160, FIG. 1) that act as triggers for a desired call. For example, a service signal from an onboard diagnostic or monitoring function may be utilized to trigger call scheduling.

The input service function 328 utilizes criteria remotely set in the telematics unit 120 by a previous call, as trigger event/events for scheduling a new outbound call. For example, if a user wanted to know every time the vehicle leaves a certain geographic area, a user utilizes web interface to set a function within the vehicle that compares the vehicle location to the specified geographic area. If in-vehicle GPS signals indicate that the vehicle leaves the specified geographic area, then the input service function determines the desire for an outbound call to transfer data of the vehicle location to the web portal for access by the user. These are only examples, and any function that utilizes remote calling can be similarly integrated with the determine outbound call routine 322.

The scheduler and execution routine 332 responds to the determine outbound call routine 322 and the call profile routine 320 to schedule the outbound call(s) requested by routine 322. The scheduler and execution routine 332 first determines whether the call needs to be placed when the vehicle is running, if not, then, if the vehicle is off, the call is scheduled for a time when the vehicle is not likely to be used. The determination is made responsive to a profile comparison 334 executed by the scheduler and execution routine 322. If the vehicle is started before the call is made, or if the call is one that requires the vehicle to be on (because, for example, information is needed from systems that are powered up only when the vehicle is on), then the scheduler estimates the required time for the call. If the required time is less than the typical time to first voice call, then the call is made after vehicle start up. If the required time is not less than the typical time to first voice call, then the call is made during an opportunity identified by the profile, such as between calls, after a certain number of calls, or at a later time in the day. The scheduler and execution routine 332 sets a target time 336 and compares the current time to the target time to execute call placement 338. In this manner, the likelihood of success of the call(s) requested by routine 322 is increased.

It is anticipated that the invention will be embodied in other specific forms not described that do not depart from its spirit or essential characteristics. The described embodiments are to be considered in all respects only as illustrative and not restrictive.

The invention claimed is:

1. A method for telematic data transfer comprising the steps of:
    monitoring time related parameters for personal communications made through a telematics unit in a vehicle between the telematics unit and at least one remote location;
    determining a communication requirement for communicating between the telematics unit and a remote facility; and
    scheduling a telematics unit communication between the telematics unit and the remote facility based on the monitored parameters and the communication requirement, and thereafter executing the scheduled communication.

2. The method of claim 1, also comprising the step of creating a profile of the monitored parameters, wherein the step of scheduling is responsive to the profile.

3. The method of claim 2, also comprising the step of: transferring the profile to the remote facility, wherein the scheduled communication is an inbound communication from the remote facility, to the telematics unit.

4. The method of claim 1, wherein the scheduled communication is an outbound communication from the vehicle to the remote facility.

5. The method of claim 1, wherein the communication requirement determines whether the scheduled communication must be placed when the vehicle is running.

6. The method of claim 1, wherein the communication requirement is a predicted time duration for the scheduled communication.

7. The method of claim 6, wherein the scheduling step further comprises:
    determining a time at which no personal communication is expected based on the monitored parameters and the time duration; and
    scheduling the telematics unit communication at the determined time.

8. The method of claim 1, wherein the scheduling step further comprises scheduling the telematics unit communication a time at which the communication requirement is met and no personal communication is expected based at least in part on the monitored parameters.

9. The method of claim 1, wherein the scheduling step further comprises scheduling the telematics unit communication a time during which there is a decreased likelihood that the scheduled communication will be interrupted by a personal communication made through the telematics unit.

10. A method for telematic data transfer comprising the steps of:
    monitoring time related parameters for personal calls made through a telematics unit in a vehicle;
    determining that the telematics unit has an outbound call to place to a remote location; and
    scheduling and executing the outbound call responsive to the parameters to increase the chance of success of the outbound call.

11. The method of claim 10, also comprising the step of creating a profile of the monitored parameters, wherein the scheduling and executing step is responsive to the profile.

12. The method of claim 10, further comprising the step of determining an outbound call requirement indicative of whether the outbound call must be placed when the vehicle is running, wherein the scheduling and executing step further comprises executing the outbound call in accordance with the call requirement.

13. The method of claim 10, further comprising the step of determining an outbound call requirement indicative of the predicted duration of the outbound call, wherein the scheduling and executing step further comprises scheduling the outbound call using the parameters and predicted duration of the outbound call.

14. A system for telematic data transfer including a telematics unit in a vehicle including a mobile communication device that has a data transfer mode and a personal communication mode, wherein activation of the personal communication mode interrupts the data transfer mode, comprising:
    a monitor for monitoring parameters for personal communications made through the telematics unit between the telematics unit and at least one remote location; and a communication scheduler for scheduling and executing a data transfer communication in the data transfer mode at a time determined using the monitored parameters and selected so as to increase the likelihood that the data transfer will successfully complete without being interrupted by activation of the personal communication mode.

15. A method for scheduling a telematic data transfer, comprising the steps of:
monitoring timing of personal communications made through a telematics unit in a vehicle;
determining a telematic data transfer requirement indicative of whether the telematic data transfer is to occur when the vehicle is running;
if the transfer requirement indicates that the telematics data transfer need not occur when the vehicle is running, then scheduling a call for the telematic data transfer from the telematics unit to a remote location such that the call is scheduled to occur at a time when the vehicle is not running; and
if the transfer requirement indicates that the telematic data transfer is to occur when the vehicle is running, then:
determining a call time using the monitored timing; and
scheduling a telematic data transfer call at the determined call time.

16. The method of claim 15, wherein the timing comprise one or more of the following: relative timing between changes in a vehicle ignition state and personal communications, time intervals between personal communications, durations of personal communications, and times of personal communications.

17. The method of claim 15, further comprising the step of estimating a required call duration for the telematic data transfer if it is determined that the telematic data transfer must occur when the vehicle is running.

18. The method of claim 15, further comprising the step of receiving a trigger at the vehicle, wherein receipt of the trigger initiates scheduling the call.

19. The method of claim 15, wherein the step of determining a call time further comprises determining a period of time to wait after vehicle start-up and wherein the step of scheduling the telematic data transfer call further comprises scheduling the telematic data transfer call to occur after the period of time following start-up of the vehicle.

* * * * *